US011191391B2

(12) United States Patent
Fu et al.

(10) Patent No.: US 11,191,391 B2
(45) Date of Patent: Dec. 7, 2021

(54) ELECTRICAL FRYER

(71) Applicant: Zhejiang Shaoxing Supor Domestic Electrical Appliance Co., Ltd., Shaoxing (CN)

(72) Inventors: Weisi Fu, Shaoxing (CN); Yongzhu Lu, Shaoxing (CN); Dongsheng Cao, Shaoxing (CN); Zhiwen Wang, Shaoxing (CN)

(73) Assignee: Zhejiang Shaoxing Supor Domestic Electrical Appliance Co., Ltd., Shaoxing (CN)

( * ) Notice: Subject to any disclaimer, the term of this patent is extended or adjusted under 35 U.S.C. 154(b) by 574 days.

(21) Appl. No.: 16/237,961

(22) Filed: Jan. 2, 2019

(65) Prior Publication Data
US 2019/0208959 A1 Jul. 11, 2019

(30) Foreign Application Priority Data

Jan. 5, 2018 (CN) .......................... 201810012023.2
Dec. 26, 2018 (WO) ................. PCT/CN2018/123815

(51) Int. Cl.
*A47J 37/12* (2006.01)
*A47J 27/00* (2006.01)
*A47J 37/04* (2006.01)

(52) U.S. Cl.
CPC ......... *A47J 37/1266* (2013.01); *A47J 27/004* (2013.01); *A47J 37/047* (2013.01);
(Continued)

(58) Field of Classification Search
CPC ................ A47J 37/1209; A47J 37/1223; A47J 37/1257; A47J 37/1266; A47J 37/1285
See application file for complete search history.

(56) References Cited

U.S. PATENT DOCUMENTS 3,263,818 A * 8/1966 Gedrich .............. A47J 37/1223
210/416.5
4,636,618 A 1/1987 Jenicot
(Continued)

FOREIGN PATENT DOCUMENTS

BE 896081 1/1983
CN 2712236 Y 7/2005
(Continued)

*Primary Examiner* — Reginald Alexander
(74) *Attorney, Agent, or Firm* — The Webb Law Firm

(57) ABSTRACT

Provided is an electrical fryer including an inner pot configured to contain oil, an oil filter configured to filter oil and drain oil contained in inner pot, an electrical heater. The electrical fryer further includes: a knob mechanism comprising a knob presenting an oil filtering position and at least one heating position; an oil filtering control mechanism connected between the knob mechanism and the oil filter; a temperature control mechanism comprising a switch assembly being drivingly connected with the knob mechanism; wherein, the knob is turned so as to switch between the oil filtering position and said at least one heating position, and when the knob is turned to the oil filtering position, the knob mechanism drives the oil filtering control mechanism to open the oil filter and the knob mechanism controls the switch assembly to switch it off so that the electrical heater is not energized, and when the knob is turned to said at least one heating position, the knob mechanism controls the switch assembly to switch it on so that the electrical heater heats the inner pot.

15 Claims, 5 Drawing Sheets

(52) U.S. Cl.
CPC ....... *A47J 37/1209* (2013.01); *A47J 37/1261* (2013.01); *A47J 37/1276* (2013.01); *A47J 37/1285* (2013.01); *A47J 37/1223* (2013.01)

(56) References Cited

U.S. PATENT DOCUMENTS

| | | | |
|---|---|---|---|
| 6,006,658 A | 12/1999 | Siu | |
| 2009/0078659 A1 | 3/2009 | Whitlock et al. | |
| 2015/0374173 A1* | 12/2015 | McGhee | A47J 37/1266 99/330 |
| 2017/0258270 A1* | 9/2017 | Man | A47J 37/1266 |
| 2017/0258271 A1* | 9/2017 | Man | A47J 37/1223 |
| 2018/0333005 A1* | 11/2018 | Fritz | A47J 37/1257 |

FOREIGN PATENT DOCUMENTS

| | | |
|---|---|---|
| CN | 201481152 U | 5/2010 |
| CN | 202112946 U | 1/2012 |
| CN | 106136956 A | 11/2016 |
| JP | 2003225171 A | 8/2003 |
| WO | 03/032795 A1 | 4/2003 |

\* cited by examiner

ELECTRICAL FRYER

CROSS-REFERENCE TO RELATED APPLICATIONS

This application claims priority to Chinese Patent Application No. 201810012023.2 filed Jan. 5, 2018, and International Application No. PCT/CN2018/123815 filed Dec. 26, 2018, the disclosures of which are hereby incorporated by reference in their entireties.

TECHNICAL FIELD

The invention relates to the technical field of home electrical appliances, and in particular, to an electrical fryer.

BACKGROUND

In existing electrical fryers, the setting of oil temperature and the filtering of oil are controlled by two knobs. There is no separate cleaning mode.

During cooking (deep frying of food), erroneous operations may occur, resulting in turning to the oil filtering mode and the fryer undergoing oil filtering while in use, which presents a high risk to safety.

SUMMARY OF THE INVENTION

A main objective of the invention is to provide an electrical fryer to solve the problem of the high risk to safety in electrical fryers of the prior art.

To achieve the above objective, the invention provides an electrical fryer, comprising an oil filter and a temperature controller; a knob mechanism comprising a knob presenting at least an oil filtering position, a cleaning position, and a cooking position; an oil filtering control mechanism connected between the knob mechanism and the oil filter; a temperature control mechanism comprising a switch assembly and a driving mechanism, the switch assembly being drivingly connected with the knob mechanism, the driving mechanism being connected between the knob mechanism and the temperature controller; wherein, the knob is turned so as to switch between the oil filtering position, the cleaning position, and the cooking position, and when the knob is turned to the oil filtering position, the knob mechanism drives the oil filtering control mechanism to open the oil filter, and when the knob is turned to the cleaning position and the cooking position, the knob mechanism controls the switch assembly to open and drives the driving mechanism so as to drive the temperature controller to control the temperature.

Further, the knob mechanism further comprises a cam fixedly connected with the knob, the oil filtering control mechanism comprises a connecting rod assembly drivingly connected with the cam so as to open the oil filter.

To achieve the above objective, the invention also provides an electrical fryer, comprising: an inner pot configured to contain oil, an oil filter configured to filter oil and drain oil contained in inner pot, an electrical heater, wherein said electrical fryer further comprises: a knob mechanism comprising a knob presenting an oil filtering position and at least one heating position; an oil filtering control mechanism connected between the knob mechanism and the oil filter; a temperature control mechanism comprising a switch assembly being drivingly connected with the knob mechanism; wherein, the knob is turned so as to switch between the oil filtering position and said at least one heating position, and when the knob is turned to the oil filtering position, the knob mechanism drives the oil filtering control mechanism to open the oil filter and the knob mechanism controls the switch assembly to switch it off so that the electrical heater is not energized, and when the knob is turned to said at least one heating position, the knob mechanism controls the switch assembly to switch it on so that the electrical heater heats the inner pot.

Further, the electrical fryer includes a temperature controller configured to control the level of energization of the electrical heater and in that the temperature control mechanism further comprises a driving mechanism being connected between the knob mechanism and the temperature controller; the at least one heating position including at least two heating positions, when the knob is turned to one of the at least two heating positions, the knob mechanism drives the driving mechanism so as to drive the temperature controller to control the temperature.

Further, the at least two heating positions include a cleaning position wherein the temperature controller controls the temperature of the inner pot at around 80° C. for the cleaning of the inner pot.

Further, the at least two heating positions include two cooking positions wherein the temperature controller controls the temperature inside the inner pot at between 130° C. and 190° C. for the frying of the food in the inner pot.

Further, the knob mechanism further comprises a cam fixedly connected with the knob; the cam being capable of taking a first position, corresponding to the filtering position, where it is drivingly connected with a connecting rod assembly of the oil filtering control mechanism which drives open the oil filter, while the switch assembly being switched off; the cam being capable of taking at least one second position, corresponding to the at least one heating position, where it is drivingly connected with the switch assembly so as to switch it on, while the oil filter being closed by the connecting rod assembly.

Further, an outer flange is provided at the periphery of the cam, the outer flange being provided with a notch where a spiral impeller is located, a first end of the spiral impeller being connected with a first end of the outer flange, the outer flange being able to drivingly connect with the switch assembly so as to control the switch assembly to switch it on or off, the spiral impeller being able to drivingly connect with the oil filtering control mechanism so as to control the oil filter to open or close.

Further, the knob mechanism further comprises a fixing cover assembly. The knob is rotationally mounted at a first side of the fixing cover assembly, and the cam is mounted at a second side opposite to the first side of the fixing cover assembly, and is fixedly connected with the knob.

Further, the fixing cover assembly comprises an external fixing cover and an internal fixing cover, with the knob mounted at the side closer to the external fixing cover and the cam mounted at the side closer to the internal fixing cover. Two supporting ears arranged opposite each other are provided at the bottom of the inner fixing cover. The connecting rod assembly comprises a first connecting rod and a first push rod. A first end of the first connecting rod is hinged between the two supporting ears, and a first end of the first push rod is connected with a second end of the first connecting rod. The turning of the cam drives the first connecting rod to swing so as to drive the first push rod to open or close the oil filter.

Further, an outer flange is provided at the periphery of the cam. During the turning of the cam, the outer flange is drivingly connected with the switch assembly so as to switch the switch assembly on or off.

Further, a spiral impeller is provided at the circumference of the cam. The outer flange is provided with a notch where the spiral impeller is located. A first end of the spiral impeller is connected with a first end of the outer flange. The spiral impeller is connected with the oil filtering control mechanism to drive the first push rod so as to control the oil filter to open or close.

Further, a driving axe is provided on the first push rod. The spiral impeller is drivingly connected with the driving axe.

Further, two connecting rod members arranged in parallel are provided on the first connecting rod. Each of the two connecting rod members is provided with a first elongated hole extending along the length direction of the connecting rod member. The first end of the first push rod is provided with a connecting axe, the two ends of which are respectively mounted into the two first elongated holes.

Further, a notch is provided at the bottom of the oil filter. An elastic valve of the oil filter is located at the notch. A second end of the first push rod is provided with a wedge-shaped member, which is driven by the movement of the first push rod to be inserted into the notch so as to open the elastic valve of the oil filter.

Further, a peripheral baffle is provided at the periphery of the wedge-shaped member. A through hole is provided at the bottom of the wedge-shaped member.

Further, a first positioning axe is provided at the side of the cam opposite the knob, and the driving mechanism comprises a second connecting rod including: a vertical rod section that is provided with a second elongated hole extending along the length direction of the vertical rod section; a horizontal rod section perpendicularly connected to the bottom of the vertical rod section; and a push rod section, a first end of which is horizontally connected onto the horizontal rod section, and a second end of which is drivingly connected with the temperature controller.

Further, the push rod section is provided with a third elongated hole extending along the length direction of the push rod section. The temperature controller is provided with a second positioning axe arranged to traverse the third elongated hole.

Further, the horizontal rod section is mounted on a positioning plate, and the switch assembly is mounted on the positioning plate and located on a flank of the cam. During the turning of the cam, the cam drives the switch assembly to switch it on; when the outer flange is drivingly connected with the switch assembly, the switch assembly is on, and the oil filtering control mechanism closes the oil filter; and, when the spiral impeller is connected with the oil filtering control mechanism, the first push rod moves so as to control the oil filter to open and the switch assembly is closed.

Further, the switch assembly comprises: a microswitch lever mounted on the positioning plate; a microswitch mounted on the positioning plate; and an elastic return member mounted between the microswitch and the microswitch lever.

Further, the rotation angle of the cam ranges between 0° C. and 270° C.

By applying the technical solution of the invention, during actual operation, by the turning of the single knob, the electrical fryer of the invention can drive the oil filtering control mechanism to open the oil filter for filtering oil, and to store the filtered oil in the oil receptacle. At the same time, by the operation of the above-mentioned knob, the switch assembly of the electrical fryer can be switched on, and the temperature of the inner pot is controlled by the temperature controller driven by the driving mechanism. Specifically, at the cleaning position B, the temperature controller controls the temperature of the inner pot at around 80° C. for the cleaning of the inner pot. When the knob is turned to the cooking positions C and D, the temperature controller controls the temperature inside the inner pot at between 130° C. and 190° C. for the frying of the food in the inner pot.

It can be understood that the electrical fryer of the invention can achieve the control of oil filtering, cleaning, and cooking with one single knob. Compared to electrical fryers provided with two knobs to separately control the oil filtering and cooking, and without any cleaning mode, the electrical fryer of the invention is safer and easy to operate, facilitating the use by users.

BRIEF DESCRIPTION OF DRAWINGS

The drawings accompanying the specification, which form a part of the present application, are provided for further understanding of the invention. The illustrative embodiment of the invention and its description are used to explain the invention, and do not constitute undue limitation on the invention. In the accompanying drawings.

Figure 1:
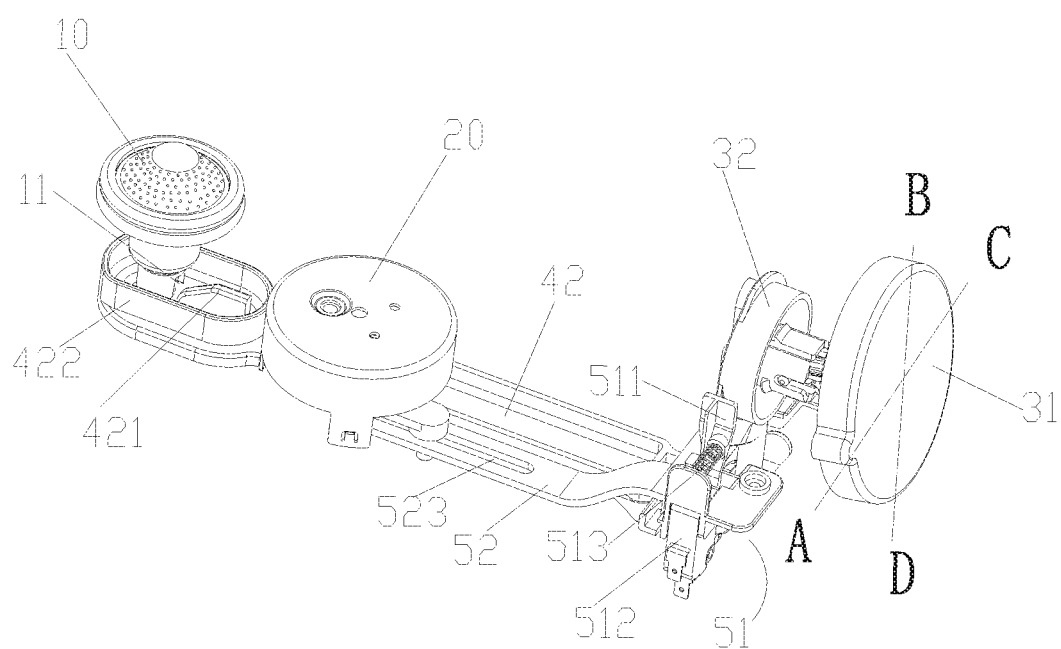
FIG. 1 schematically shows a first perspective view of the knob mechanism, oil filtering control mechanism, and temperature control mechanism of an electrical fryer of the invention.
Figure 2:
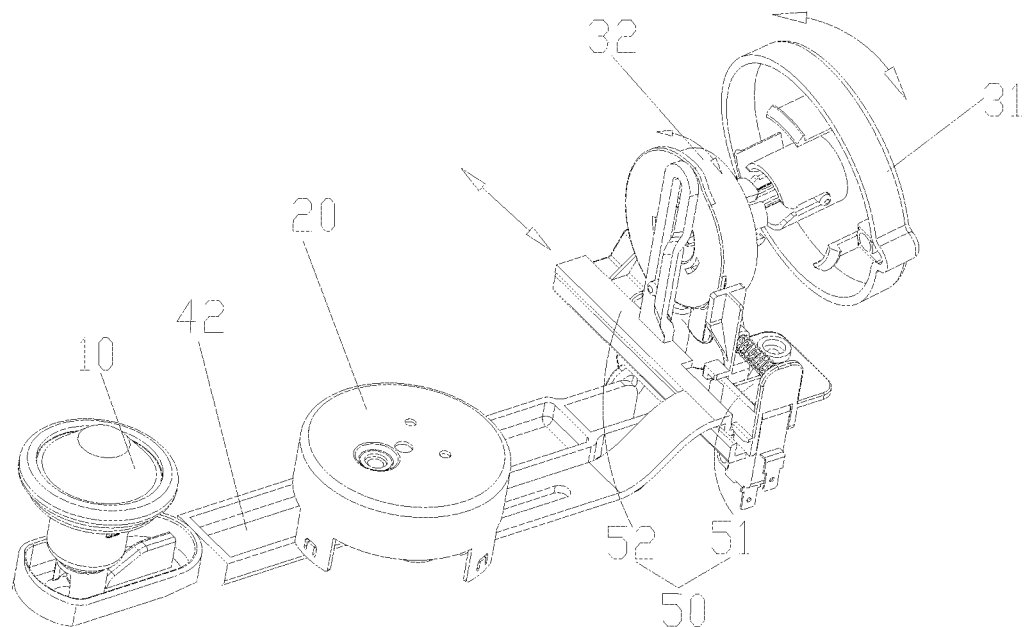
FIG. 2 schematically shows a perspective view from inside of the knob mechanism, oil filtering control mechanism, and temperature control mechanism of an electrical fryer of the invention.

The accompanying drawings contain the following references:

10: oil filter; 11: notch; 12: evacuation conduit; 14: control valve; 15: emptying device; 16: thermostatic valve; 20: temperature controller; 21: second positioning axe; 30: knob mechanism; 31: knob; 32: cam; 321: first positioning axe; 322: spiral impeller; 323: outer flange; 3231: notch; 33: external fixing cover; 34: internal fixing cover; 341: supporting ears; 40: oil filtering control mechanism; 41: first connecting rod; 411: connecting rod members; 412: connecting axe; 413: first elongated hole; 414: driving axe; 42: first push rod; 421: wedge-shaped member; 422: peripheral baffle; 423: through hole; 424 connecting axe; 50: temperature control mechanism; 51: switch assembly; 511: microswitch lever; 512: microswitch; 513: elastic return member: 52: second connecting rod; 521: vertical rod section; 5211: second elongated hole; 522: horizontal rod section; 523: push rod section;

5231: third elongated hole; 524: positioning plate; 60: inner pot; 70: oil receptacle; 80: electrical heater.

DETAILED DESCRIPTION OF THE EMBODIMENTS

It should be noted that, so long as there is no conflict, the embodiments in the present application and the characteristics in those embodiments can be combined with each other. The invention is described below in reference to the accompanying drawings and in connection with embodiments.

It should be noted that, the terms used herein are merely employed for describing particular modes of realization, and not for limiting exemplary modes of realization according to the present application. As used herein, unless the context otherwise specifies, the singular form also includes the plural form. In addition, it should be understood that, when the terms "include" and/or "comprise" are used in the specification, they express the presence of a characteristic, step, operation, device, assembly, and/or their combination.

It should be noted that, the terms "first", "second", etc. in the specification, claims, and the above-described accompanying drawings of the present application are used for distinguishing similar objects, and not necessarily for describing a particular order or sequence. It should be understood that numbers used in this way are interchangeable in appropriate situations so that the modes of realization of the present application described herein can be realized in an order other than those illustrated or described herein. In addition, the terms "comprise" and "present" and any of their different forms are intended to mean a non-exclusive inclusion. For example, a process, method, system, product, or device comprising a series of steps or units is not necessarily limited to those steps or units that have been clearly specified, but may include other steps or units that have not been clearly specified or are inherent to the process, method, product, or device.

To facilitate the description, spatial relation terms, such as "on," "above," "on the upper surface of," and "superior," can be used herein to describe the spatial position relationship between an element or feature illustrated in the drawings and another element or feature. It should be understood that the spatial relation terms are intended to comprise different orientations of the device in use or operation, in addition to the orientation described in the figures. For example, if the elements in the accompanying drawings are positioned inversely, then elements described as "above another element or construction" or "on another element or construction" subsequently will be positioned "below another element or construction" or "underneath another element or construction". Therefore, as an example, the term "above" can include the two positions of "above" and "below." The element can also be positioned in another different manner (by rotating 90 degrees or being located at a different position), and the spatial relation description herein should be interpreted accordingly.

As shown in FIG. 1 to FIG. 8, according to an embodiment of the invention, an electrical fryer is provided. The electrical fryer in the embodiment comprises an oil filter 10 with an emptying device 15, a temperature controller 20, a knob mechanism 30, an oil filtering control mechanism 40, a temperature control mechanism 50, an inner pot 60, an oil receptacle 70, an electrical heater 80, and a housing (not shown).

Figure 8:
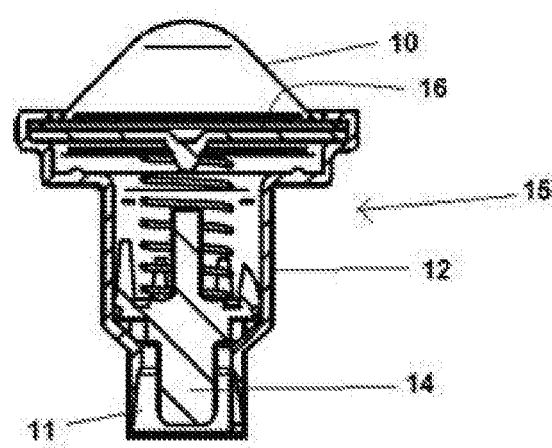
FIG. 8 schematically shows a sectional view of the oil filter.

As best seen in FIG. 8, the emptying device 15 comprises an evacuation conduit 12 protected by the oil filter 10, a control valve 14 arranged within said evacuation conduit 12 and being configured to be movable between a closed position blocking the oil from passing through the evacuation conduit 12 and an opened position allowing the oil to pass through the evacuation conduit 12. Preferably control valve 14 is a spring-loaded valve or an elastic valve. Optionally, a thermostatic valve 16 can be arranged between oil filter 10 and control valve 14 to allow flowing of oil only if temperature of oil is below a safe temperature.

The inner pot 60 (FIG. 5) is arranged inside the housing, the electrical heater 80 is arranged at the bottom of the inner pot 60 so as to heat up the content of the inner pot 60. The temperature controller 20 and the oil filter 10 are arranged at the bottom of the inner pot 60 so as to control the temperature inside the inner pot 60 and to filter the oil inside the inner pot 60. The temperature controller 20 is configured to control the level of energization of the electrical heater 80.

Figure 4:
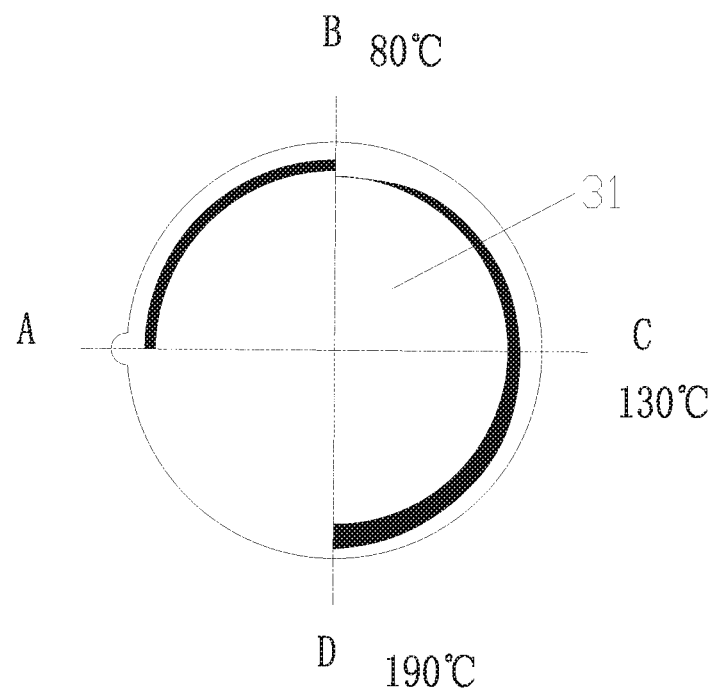
FIG. 4 schematically shows an elevational view of a knob of the invention.
Figure 5:
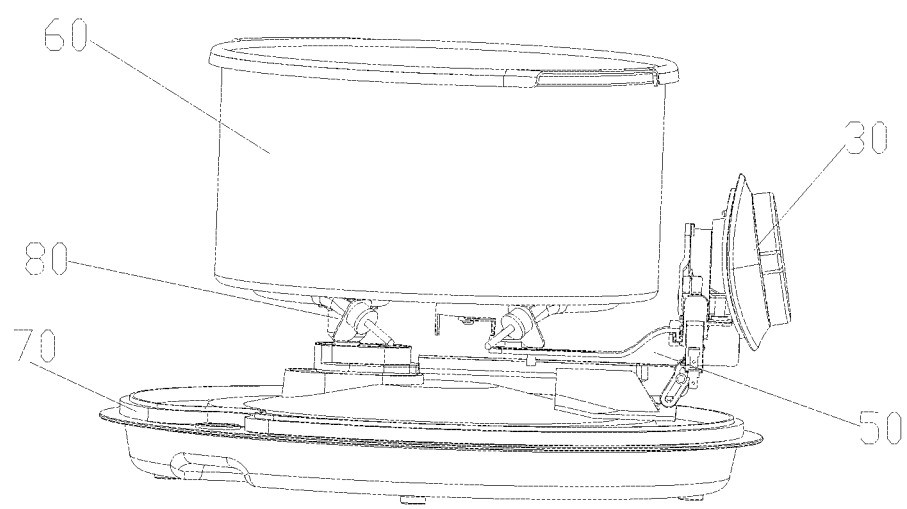
FIG. 5 schematically shows an elevational view of an electrical fryer of the invention, with its housing dismounted.
Figure 6:
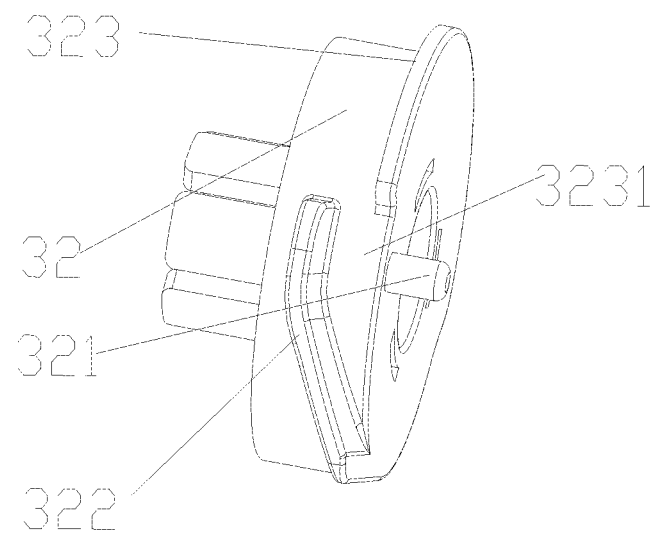
FIG. 6 schematically shows a perspective view of a cam of the invention.

As seen in FIGS. 1 and 4, the knob mechanism 30 of the embodiment comprises a knob 31 presenting at least an oil filtering mode A, a cleaning position B, and cooking positions C and D. Cleaning position B and cooking positions C and D are heating positions wherein heating of electrical heater 80 is allowed. If desired, the knob 31 can include at least one cooking position. The oil filtering control mechanism 40 is connected between the knob mechanism 30 and the oil filter 10. The temperature control mechanism 50 comprises a switch assembly 51 drivingly connected with the knob mechanism 30, and a driving mechanism connected between the knob mechanism 30 and the temperature controller 20.

When the knob 31 is turned, it can switch between the oil filtering position A, the cleaning position B, and the cooking positions C and D. When the knob 31 is turned to the oil filtering position A, the knob mechanism 30 drives the oil filtering control mechanism 40 to open the oil filter 10. When the knob 31 is turned to the cleaning position and the cooking positions C and D, the knob mechanism 30 drives the switch assembly 51 to switch it on so that the electrical heater 80 can be energized, and drives the driving mechanism to drive the temperature controller 20 to control the temperature. When the knob 31 is turned to the oil filtering position A the knob mechanism 30 drives the switch assembly 51 to switch it off so that the electrical heater 80 is not energized.

During actual operation, by turning the knob 31, the electrical fryer of the embodiment can drive the oil filtering control mechanism 40 to open the oil filter 10 for filtering oil, and can store the filtered oil in the oil receptacle 70. At the same time, by the operation of the above-mentioned knob 31, the switch assembly 51 of the electrical fryer can be switched on, and, control the temperature of the inner pot 60 through the temperature controller 20 driven by the driving mechanism. Specifically, at the cleaning position B, the temperature controller 20 controls the temperature of the inner pot 60 at around 80° C. for the cleaning of the inner pot. When the knob 31 is turned to the cooking positions C and D, the temperature controller 20 controls the temperature inside the inner pot 60 at between 130° C. and 190° C. for frying of the food in the inner pot 60.

It can be understood that the electrical fryer of the invention can achieve the control of oil filtering, cleaning, and cooking with one single knob 31. Compared to electrical fryers provided with two knobs to separately control the oil filtering and the cooking, and without any cleaning mode, the electrical fryer in the embodiment is safer and easy to operate, facilitating the use by the users.

The knob mechanism 30 in the embodiment further comprises a cam 32 and a fixing cover assembly. During assembling, the knob 31 is rotationally fixed at a first side of the fixing cover assembly, the cam 32 is fixed at a second side opposite to the first side of the fixing cover assembly, and is fixedly connected with the knob 31. When the knob 31 is turned, it will drive the cam 32 to turn along with it, thus driving the oil filtering control mechanism 40 and the temperature control mechanism 50 to operate.

To facilitate their connection, a snap is provided on the knob 31 of the embodiment, and a groove is provided on the cam 32 correspondingly. The knob 31 and the cam 32 are fixedly connected through the snap and the groove, resulting in a simple structure that is easy to assemble.

The fixing cover assembly in the embodiment comprises an external fixing cover 33 and an internal fixing cover 34. During assembling, the fixing cover assembly is mounted on the housing of the electrical fryer, with the knob 31 mounted at the side closer to the external fixing cover 33 and the cam 32 mounted at the side closer to the internal fixing cover 34, ensuring the perfection of the external appearance of the entire electrical fryer.

To facilitate the installation of the oil filtering control mechanism 40, in the embodiment, two supporting ears 341 opposite each other are provided at the bottom of the inner fixing cover 34, and the oil filtering control mechanism 40 comprises a connecting rod assembly drivingly connected with the cam 32 so as to open the oil filter 10. Specifically, the connecting rod assembly comprises a first connecting rod 41 and a first push rod 42. During assembling, a first end of the first connecting rod 41 is hinged between the two supporting ears 341, and a first end of the first push rod 42 is connected with a second end of the first connecting rod 41. When the cam 32 turns, it drives the first connecting rod 41 to swing so as to drive the first push rod 42 to open or close the oil filter 10.

An outer flange 323 and a spiral impeller 322 are provided at the circumference of the cam 32. The outer flange 323 is provided with a notch 3231 where the spiral impeller 322 is located, and a first end of the spiral impeller 322 is connected with a first end of the outer flange 323. During the turning of the cam 32, the outer flange 323 is drivingly connected with the switch assembly 51 so as to switch the switch assembly 51 on or off, and the spiral impeller 322 is connected with the oil filtering control mechanism 40 to drive the first push rod 42 so as to control the oil filter 10 to open or close.

Preferably, a driving axe 414 is provided on the first connecting rod 41. The driving axe 414 is engaged with the bottom of the cam 32. Two pivoting axles 412 are provided on first connecting rod 41 to allow rotation on supporting ears 341 of inner fixing cover 34. The turning of the cam 32 can allow the spiral impeller 322 to drive the driving axe 414 to rotate along the supporting ears 341, thanks to the two pivoting axles 412, thus driving the first push rod 42 to move so as to open the oil filter 10 for filtering oil.

In order to prevent the interference from happening, in the embodiment, two connecting rod members 411 arranged in parallel are provided on the first connecting rod 41. Each of the two connecting rod members 411 is provided with a first elongated hole 413 extending along the length direction of the connecting rod member 411. The first end of the first push rod 42 is provided with a connecting axe 424, the two ends of which are, respectively, mounted into the two first elongated holes 413. When the cam 32 drives the first connecting rod 41 to rotate, the first push rod 42 extends and retreats along the first elongated holes 413, so as to open the oil filter 10.

Figure 3:
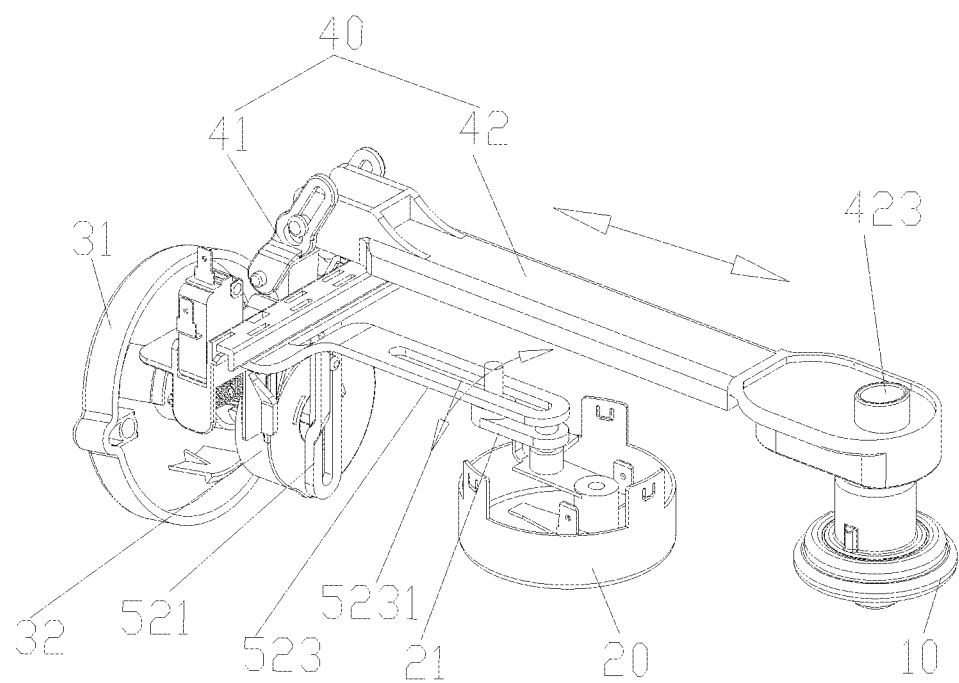
FIG. 3 schematically shows a perspective view upside down of the knob mechanism, oil filtering control mechanism, and temperature control mechanism of an electrical fryer of the invention.
Figure 7:
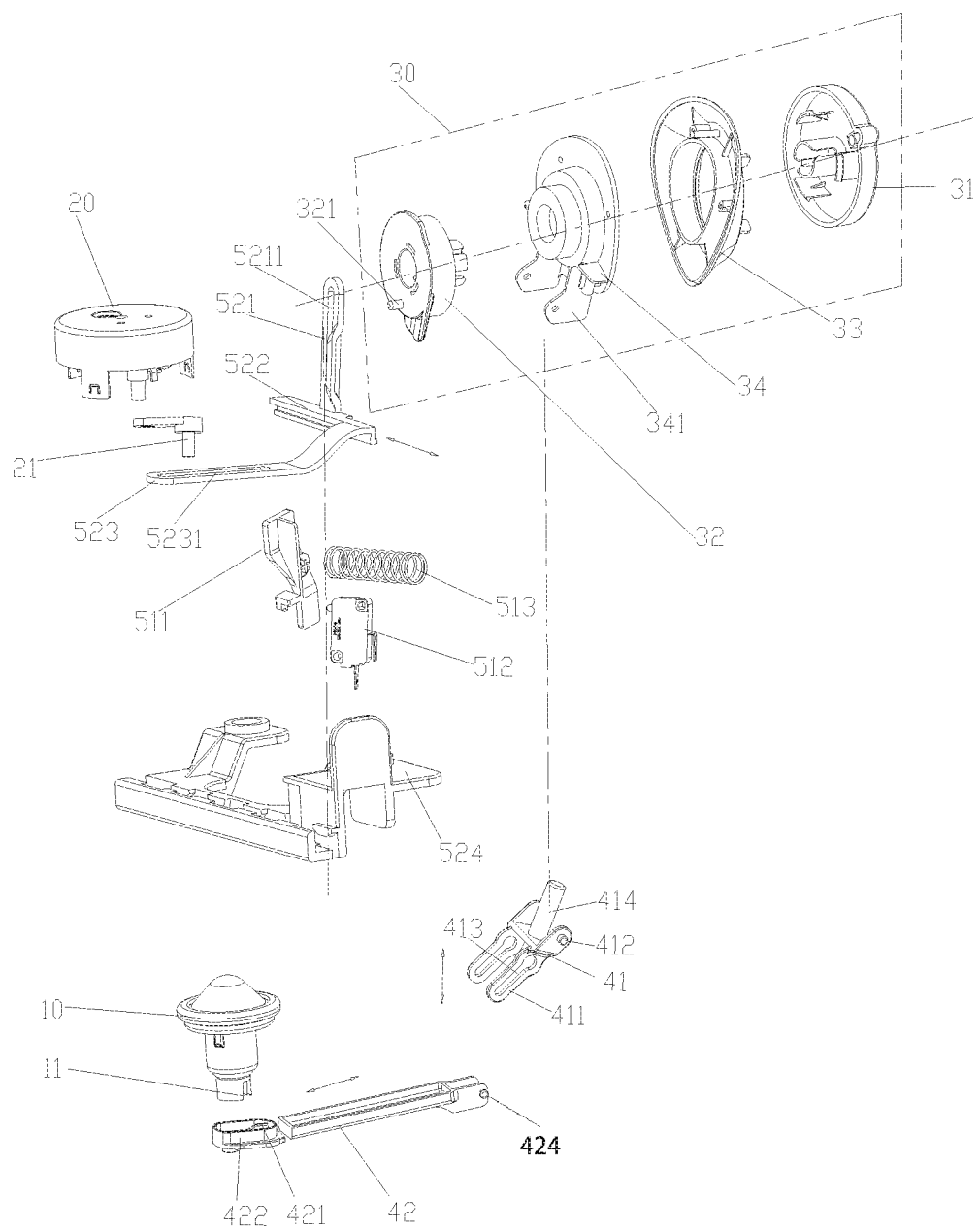
FIG. 7 schematically shows an exploded view of a knob mechanism, oil filtering control mechanism, and temperature control mechanism of the invention.

With reference to FIG. 1, FIG. 3, and FIG. 7, a notch 11 is provided at the bottom of the oil filter 10.

An elastic valve of the oil filter 10 is located at the notch 11. A wedge-shaped member 421 is provided at a second end of the first push rod 42. When the cam portion of the cam 32 bears against the driving axe 414, the first push rod 42 rotates along the supporting ears 341, and the first push rod 42 extends and retreats along the first elongated holes 413, thus driving the wedge-shaped member 421 to insert into the notch 11, opening the elastic valve of the oil filter 10. When the cam portion of the cam 32 has rotated past the driving axe 414, the wedge-shaped member 421 returns to its initial position under the effect of the elastic valve of the oil filter 10, thus driving the first push rod 42 and the first connecting rod 41 to return to their initial positions, the oil filter 10 closing automatically.

Preferably, in the embodiment, a peripheral baffle 422 is provided at the periphery of the wedge-shaped member 421. A through hole 423 is provided at the bottom of the wedge-shaped member 421. The peripheral baffle 422 facilitates the collection of the oil flowing out of the oil filter 10 around the wedge-shaped member 421, thus entering the oil receptacle 70 through the through hole 423.

With reference to FIG. 1 to FIG. 3, FIG. 6, and FIG. 7, to install the temperature control mechanism 50, in the embodiment, a first positioning axe 321 is provided at the side of the cam 32 opposite the knob 31, and the driving mechanism comprises a second connecting rod 52 comprising a vertical rod section 521, a horizontal rod section 522, and a push rod section 523.

The vertical rod section 521 is provided with a second elongated hole 5211 extending along the length direction of the vertical rod section 521. The first positioning axe 321 is arranged to be inserted in the second elongated hole 5211. The horizontal rod section 522 is perpendicularly connected to the bottom of the vertical rod section 521. A first end of the push rod section 523 is horizontally connected onto the horizontal rod section 522, and a second end of the push rod section 523 is drivingly connected with the temperature controller 20.

During operation, when the knob 31 drives the cam 32 to turn with it, the first positioning axe 321 moves along the second elongated hole 5211 and drives the horizontal rod section 522 to move in the horizontal direction, thus driving the push rod section 523 to move in the horizontal direction. In the course of horizontal moving, the push rod section 523 drives the temperature controller 20 to control temperature.

Preferably, in the embodiment, the push rod section 523 is provided with a third elongated hole 5231 extending along the length direction of the push rod section 523. The temperature controller 20 is provided with a second positioning axe 21 arranged to traverse the third elongated hole 5231. When the horizontal rod section 522 moves in the horizontal direction, the second positioning axe 21 rotates at the same time of moving along the third elongated hole 5231, so as to drive the temperature controller 20 to control temperature.

In the embodiment, the horizontal rod section 522 is mounted on a positioning plate 524, and the switch assembly 51 is mounted on the positioning plate 524 and located on a flank of the cam 32. During the turning of the cam 32, the cam 32 drives the switch assembly 51 to switch it on.

When the cam 32 turns, when the outer flange 323 is drivingly connected with the switch assembly 51, the switch assembly 51 is on, and the oil filtering control mechanism 40 closes the oil filter 10. When the spiral impeller 322 is connected with the oil filtering control mechanism 40, the first push rod 42 moves so as to control the oil filter 10 to open while the switch assembly 51 is closed.

Specifically, in the embodiment, the switch assembly 51 comprises a microswitch lever 511, a microswitch 512, and an elastic return member 513.

The microswitch lever 511 is mounted on the positioning plate 524, the microswitch 512 is mounted on the positioning plate 54, and the elastic return member 513 is mounted between the microswitch 512 and the microswitch lever 511.

When the cam portion of the cam 32 turns to where the microswitch lever 511 is, the outer flange 323 touches the microswitch lever 511 and triggers its movement, thus compressing the elastic return member 513, thus turning the microswitch 512 on, so as to switch on the electrical heater 80 to heat of the inner pot 60. During actual operation, when the knob 31 is turned to the oil filtering mode A, the spiral impeller 322 is connected with the oil filtering control mechanism 40, and the switch assembly 51 is switched off.

The flank of the cam 32 is provided with the spiral impeller 322, which forms the cam portion of the cam 32, so as to drive the first connecting rod 41 and the switch assembly 51 to move.

Preferably, in the embodiment, the elastic return member 513 is a spring. Of course, in other embodiments of the invention, the elastic return member 513 can be other means such as an elastic rubber member. Other variants, so long as they are based on the conception of the invention, fall within the scope of protection of the invention.

Based on the structure described above, it can be seen that in the present invention the switch-on and switch-off of the electrical heater 80 of the electrical fryer is controlled by the microswitch 512 which is controlled by the cam 32, which is connected to and driven by the knob 31.

At the same time, the temperature of the temperature controller 20 is controlled, through the driving mechanism connected with the cam 32, by controlling the knob 31 to drive the cam 32 which is connected with it, so as to control the oil temperature inside the electrical fryer.

At the same time, the operation of the oil filter 10 is controlled by the oil filtering control mechanism 40 driven by the cam 32, which is connected to and driven by the knob 31.

Preferably, in the embodiment, the cam 32 can rotate clockwise or counter-clockwise, with a rotation angle ranging between 0° C. and 270° C. During operation, at the A position, the continuous rotation of the cam 32 past the mode A is limited by the spiral impeller 322, and at the D location, the continuous rotation of the cam 32 past the mode D is limited by the second elongated hole 5211.

It can be seen from the above description, the embodiment of the invention described above achieves the following technical effect: in the invention, oil temperature adjustment and oil filtering are controlled by the same knob, without any possibility of erroneous operation; the cam connected with the knob controls and ensures that the electrical fryer is not powered on (not operating) during the filtering of oil, and is powered on only during a cooking phase. The cooking temperature of the invention ranges from 80° C. to 190° C. Further, with the provision of the cleaning mode (80° C.), even if one forgets to turn it off, the water in the pot will not be dried since it has not reached boiling, thus it is safer The above is merely a preferred embodiment of the invention, and does not mean to limit the invention. For a person skilled in the art, the invention can be subject to various modifications and changes. Any modification, equivalent substitution, and improvement that is within the spirit and principle of the invention falls within the scope of protection of the invention.

The invention claimed is:

1. An electrical fryer comprising:
an inner pot configured to contain oil,
an oil filter configured to filter oil and drain oil contained in inner pot,
an electrical heater,
further comprising:
a knob mechanism comprising a knob presenting an oil filtering position and at least one heating position;
an oil filtering control mechanism connected between the knob mechanism and the oil filter;
a temperature control mechanism comprising a switch assembly being drivingly connected with the knob mechanism;
wherein, the knob is turned so as to switch between the oil filtering position and said at least one heating position, and when the knob is turned to the oil filtering position, the knob mechanism drives the oil filtering control mechanism to open the oil filter and the knob mechanism controls the switch assembly to switch it off so that the electrical heater is not energized, and when the knob is turned to said at least one heating position, the knob mechanism controls the switch assembly to switch it on so that the electrical heater heats the inner pot.

2. The electrical fryer of claim 1, including: a temperature controller configured to control the level of energization of the electrical heater and wherein the temperature control mechanism further comprises a driving mechanism being connected between the knob mechanism and the temperature controller; the at least one heating position including at least two heating positions, when the knob is turned to one of the at least two heating positions, the knob mechanism drives the driving mechanism so as to drive the temperature controller to control the temperature.

3. The electrical fryer of claim 2, wherein the at least two heating positions include a cleaning position wherein the temperature controller controls the temperature of the inner pot at around 80° C. for the cleaning of the inner pot.

4. The electrical fryer of claim 2, wherein the at least two heating positions include two cooking positions wherein the temperature controller controls the temperature inside the inner pot at between 130° C. and 190° C. for the frying of the food in the inner pot.

5. The electrical fryer of claim 1, wherein, the knob mechanism further comprises a cam fixedly connected with the knob;
the cam being capable of taking a first position, corresponding to the filtering position, where it is drivingly connected with a connecting rod assembly of the oil filtering control mechanism which drives open the oil filter, while the switch assembly being switched off;
the cam being capable of taking at least one second position, corresponding to the at least one heating position, where it is drivingly connected with the switch assembly so as to switch it on, while the oil filter being closed by the connecting rod assembly.

6. The electrical fryer of claim 5, wherein, an outer flange is provided at the periphery of the cam, the outer flange being provided with a notch where a spiral impeller is located, a first end of the spiral impeller being connected with a first end of the outer flange, the outer flange being able to drivingly connect with the switch assembly so as to control the switch assembly to switch it on or off, the spiral impeller being able to drivingly connect with the oil filtering control mechanism so as to control the oil filter to open or close.

7. The electrical fryer of claim 5, wherein, the knob mechanism further comprises a fixing cover assembly, the knob being rotationally mounted at a first side of the fixing cover assembly, and the cam being mounted at a second side opposite to the first side of the fixing cover assembly, and fixedly connected with the knob.

8. The electrical fryer of claim 7, wherein, the oil filter comprises a control valve arranged in an evacuation conduit and configured to be movable between a closed position blocking the oil passing through evacuation conduit and an open position allowing the oil passing through the evacuation conduit, the control valve is accessible through a notch located at the bottom of the oil filter, the connecting rod assembly comprises a first connecting rod and a first push rod, a driving axe being provided on the first push rod, a first end of the first connecting rod being hinged with the fixing cover assembly, and a first end of the first push rod being connected with a second end of the first connecting rod, a second end of the first push rod is provided with a wedge-shaped member, which is configured to be driven by the movement of the first push rod to be inserted into the notch so as to open the control valve of the oil filter, the spiral impeller being able to drivingly connect with the driving axe so as to swing the first connecting rod to drive the first push rod.

9. The electrical fryer of claim 8, wherein, the fixing cover assembly comprises an external fixing cover and an internal fixing cover, with the knob mounted at the side closer to the external fixing cover and the cam mounted at the side closer to the internal fixing cover, two supporting ears arranged opposite each other being provided at the bottom of the inner fixing cover.

10. The electrical fryer of claim 8, wherein, two connecting rod members arranged in parallel are provided on the first connecting rod, each of the two connecting rod members being provided with a first elongated hole extending along the length direction of the connecting rod member, the first end of the first push rod being provided with a connecting axe, the two ends of which are respectively mounted into the two first elongated holes.

11. The electrical fryer of claim 8, wherein, a peripheral baffle is provided at the periphery of the wedge-shaped member and a through hole is provided at the bottom of the wedge-shaped member.

12. The electrical fryer of claim 5, wherein, a first positioning axe is provided at the side of the cam opposite the knob, and the driving mechanism comprises a second connecting rod including:
    a vertical rod section that is provided with a second elongated hole extending along the length direction of the vertical rod section, the first positioning axe being arranged to traverse the second elongated hole;
    a horizontal rod section perpendicularly connected to the bottom of the vertical rod section and being mounted on a positioning plate, and,
    a push rod section, a first end of which being horizontally connected onto the horizontal rod section, and a second end of which being drivingly connected with the temperature controller.

13. The electrical fryer of claim 12, wherein, the push rod section is provided with a third elongated hole extending along the length direction of the push rod section, the temperature controller being provided with a second positioning axe arranged to traverse the third elongated hole.

14. The electrical fryer of claim 5, wherein, the switch assembly is mounted on the positioning plate and located on a flank of the cam, the switch assembly comprising:
    a microswitch lever mounted on the positioning plate;
    a microswitch mounted on the positioning plate; and,
    an elastic return member mounted between the microswitch and the microswitch lever.

15. The electrical fryer of claim 5, wherein, the rotation angle of the cam ranges between 0° C. and 270° C.

\* \* \* \* \*